May 24, 1932.  C. D. JERMYN  1,859,704
NONRETURN DEVICE
Filed Aug. 4, 1930
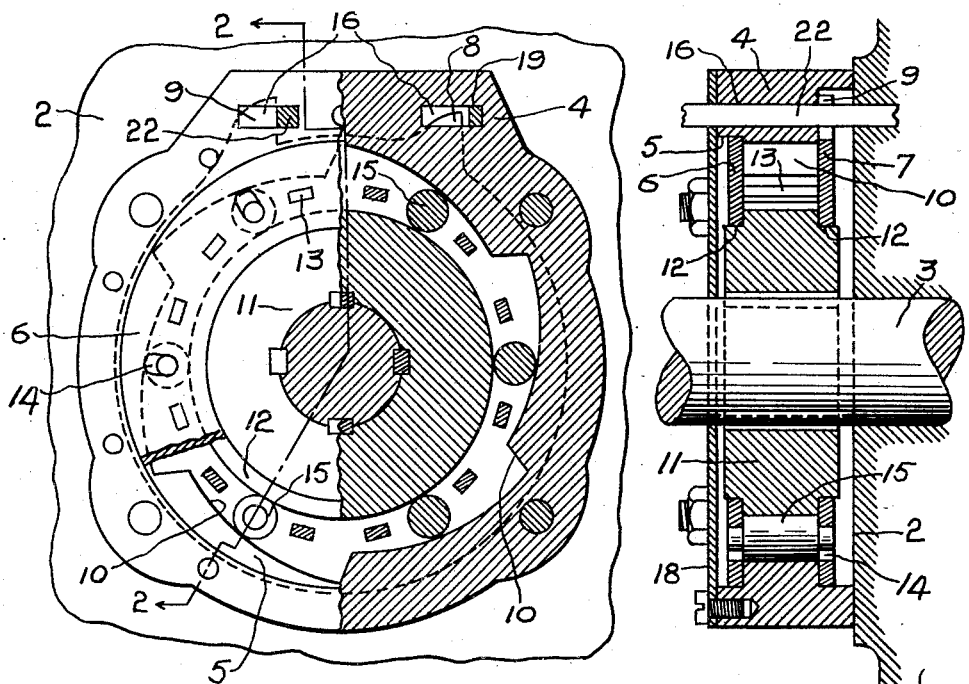
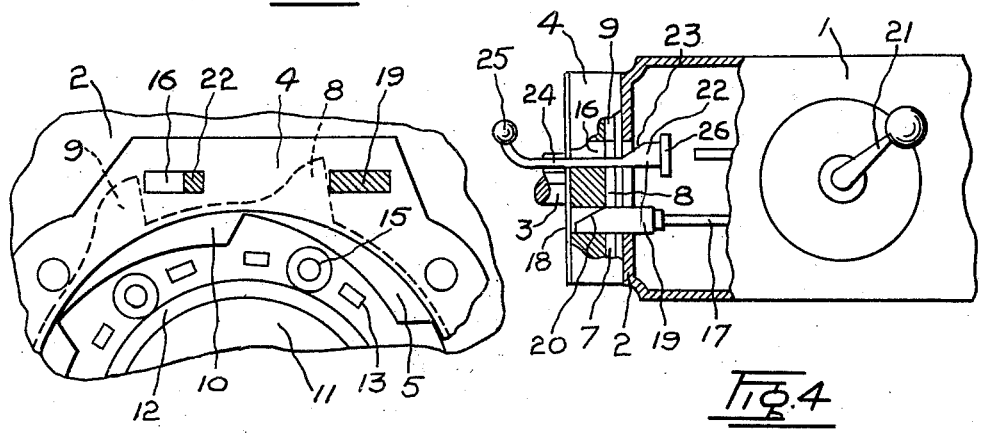
INVENTOR
CHARLES DAVID JERMYN
BY
Fetherstonhaugh & Co
ATTORNEYS Patented May 24, 1932

1,859,704

UNITED STATES PATENT OFFICE

CHARLES DAVID JERMYN, OF NORTH VANCOUVER, BRITISH COLUMBIA, CANADA

NONRETURN DEVICE

Application filed August 4, 1930, Serial No. 472,920, and in Canada April 5, 1930.

My invention relates to improvements in non-return devices which are particularly designed for use on motor vehicles. The objects of the invention are to provide an automatic means to prevent a motor vehicle from running backwards down a grade when the brakes are not applied, whereby greater convenience to the driver results when waiting on an up-grade for traffic signals and the like, which obviates the necessity of applying the brake or holding the car against the backward force by slipping his clutch and enabling him to keep his engine in proper control at starting with the accelerator pedal. Further objects are to provide means whereby the device becomes inoperative when the gears are set in reverse or when it is desired to push the car backwards.

The invention consists essentially of a clutch applied to the drive shaft preferably adjacent the transmission case and means associated with the reverse gear shift for rendering the clutch inoperative, as will be more fully described in the following specification and shown in the accompanying drawings, in which:—

Fig. 1 is a view of the device looking towards the transmission case showing one half of the cover removed.

Fig. 2 is a sectional view taken on the line 2—2 of Figure 1.

Fig. 3 is a fragmentary view of the clutch ring set in inoperative position in response to the setting of the change speed lever into reverse position.

Fig. 4 is a plan view showing the device and its connections with the change speed gear.

In the drawings like characters of reference indicate corresponding parts in each figure.

The numeral 1 indicates generally a transmission case of a motor vehicle having an end plate 2 in which a drive shaft 3 is journalled. Fitted to the end plate 2 and concentrically surrounding the shaft 3 is a casing generally indicated by the numeral 4. The casing is recessed both front and rear to receive as at 5 a pair of rockingly mounted rings 6 and 7, the former being annular and the latter having outwardly projecting lugs 8 and 9 (shown in dotted line in Figures 1 and 3). The intermediate portion of the casing is provided with a plurality of wedge shaped internal projections 10 whose inner faces converge towards the shaft 3. Keyed to the shaft 3 is a circular disc 11 having a recess 12 on each of its faces which co-operate with the recesses 5 to form bearings for the rings 6 and 7. The rings 6 and 7 are connected together with transverse members 13 and are provided at regular intervals with radial slots 14, which loosely journal a plurality of transverse rollers 15.

The casing 4 is provided with a pair of longitudinal rectangular openings 16 which are so spaced above the shaft that one of them is substantially in line with the gear shift sliding rod 17, through which the reverse gear is set in the transmission case. The rear end of the casing is normally fitted with a cover plate 18 to enclose the clutch mechanism. Fitted to the rear end of the rod 17 is a bolt 19, splayed at its rear end as at 20, which projects into one of the apertures 16 and is so spaced that when the gear shift lever 21 is in neutral or any position but reverse, the lug 8 of the ring 7 is free to move but when the gear shift lever is set to "reverse", the rod 17 is thrust rearwardly and its end or attachment 19 is placed in position to prevent the motion of the lug 8 and consequently the rings 6 and 7, thus preventing the rollers 15 carried by the rings 6 and 7 from being brought into locking contact between the diametrically inclined surfaces 10 of the casing 4 and the periphery of the disc 11.

A further bolt 22 is provided having a splayed portion 23 and a sliding rod 24 fitted with a knob 25, which knob extends to a convenient position above the floor boards of the car for hand operation. The portion 22 is provided with an enlargement 26 which acts as a stop to prevent the bolt from being withdrawn from the transmission case.

Having thus described the several parts of my invention I will now briefly explain its function.

When the change speed lever 21 is in neutral, first, second or high speeds forward and the knob 25 is moved to its extreme forward position the rings 6 and 7 and their associated parts are free to rock in either direction. If the car is in motion in a forward direction the drive shaft 3 is rotating in an anticlockwise direction, as viewed in Figure 1, and the disc 11 secured to the shaft ends to move the rings 6 and 7 through their rollers 15 in a similar direction, so that no binding contact is established between the rollers, the periphery of the disc 11 and the surfaces of the wedges 10. Should the car tend to move rearwardly the rollers and their retaining rings are urged by the clockwise movement of the shaft 3 in a similar direction so that the said rollers engage the wedges 10, thus locking the disc 11 and the shaft against further movement. When the gear shift lever 21 is in neutral, first, second or high speeds forward and the knob 25 is moved to its extreme forward position, the lugs 8 and 9, and consequently the rings 6 and 7 with their associated parts are free to move in either direction following the motion of the disc 11 on which they are fitted. If the car is in forward motion the drive shaft 3 is rotating in an anticlockwise direction, as viewed in Figure 1, and the rings 6 and 7 with their associated rollers, 15, journalled therein, are moved by the disc 11 on which they are fitted in such direction as to remove the keep the rollers 15 out of any engagement between the diametrically inclined surfaces 10 of the casing 4 and the periphery of the disc 11, thus preventing any locking contact. Should the car tend to move rearwardly the rings 6 and 7 and their associated rollers 15 are urged by the disc 11 on which they are fitted, in a clockwise direction thus carrying the rollers 15 into a locking engagement between the diametrically inclined surfaces 10 of the casing 4 and the periphery of the disc 11 and so preventing any further backward movement of the car. When the gear shift lever 21 is moved into "reverse" position its rod 17 and attachment 19 are moved rearwardly thus interposing the part 19 to prevent any motion of the lug 8 consequently the rings 6 and 7 cannot move and the rollers 15 journalled in the rings 6 and 7 are kept and held out of any locking contact between the periphery of the disc 11 and the diametrically inclined surfaces 10 of the casing 4, and the disc 11 is thus left free to revolve with the shaft 3 and the car can be driven rearwardly.

If the gear shift lever is in neutral and the part 19 retracted, and it is desired to move the car rearwardly by pushing it, the knob 24 is drawn to the rear to the limit of its movement thus moving the bolt 22 to thrust the lug 9 and consequently the rings 6 and 7 in an anticlockwise direction so that the rollers 15 journalled in the rings 6 and 7 are carried and held out of engagement in exactly the same manner as when the gear shift lever is placed in "reverse", thus allowing the free movement of the car.

What I claim as my invention is:

1. The combination with a motor vehicle transmission gear and drive shaft of a disc rigidly secured to said drive shaft, a casing, a plurality of cam surfaces equi-spaced formed on the inner surface of said casing and equi-distant from the drive shaft, roller carrying means mounted on opposite sides of said disc and in frictional contact therewith forming the sole means for causing the engagement or disengagement of the rollers with the cam surfaces depending upon direction of rotation of the drive shaft.

2. The combination with a motor vehicle transmission gear and drive shaft of a disc rigidly secured to said drive shaft, a casing, a plurality of cam surfaces equi-spaced formed on the inner surfaces of said casing and equi-distant from the drive shaft, a pair of rings rockingly mounted on opposite sides of said disc and in frictional contact therewith, one of said rings having means associated therewith to control their rocking movement, means for securing said rings in spaced relation, a plurality of rollers having their free ends carried by said rings and the rocking of said rings forming the sole means for causing the engagement or disengagement of the roller with the cam surfaces for a purpose specified.

Dated at Vancouver, B. C., this 11th day of July, 1930.

CHARLES DAVID JERMYN.